US012586775B2

(12) United States Patent
Kwon et al.

(10) Patent No.: US 12,586,775 B2
(45) Date of Patent: Mar. 24, 2026

(54) ANODE FOR SECONDARY BATTERY AND JELLY-ROLL TYPE ELECTRODE ASSEMBLY INCLUDING ANODE

(71) Applicant: LG ENERGY SOLUTION, LTD., Seoul (KR)

(72) Inventors: Jung Geun Kwon, Daejeon (KR); Ki Hoon Paeng, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/034,722

(22) PCT Filed: Oct. 11, 2022

(86) PCT No.: PCT/KR2022/015248
§ 371 (c)(1),
(2) Date: May 1, 2023

(87) PCT Pub. No.: WO2023/063673
PCT Pub. Date: Apr. 20, 2023

(65) Prior Publication Data
US 2023/0411594 A1      Dec. 21, 2023

(30) Foreign Application Priority Data
Oct. 12, 2021      (KR) ........................ 10-2021-0135030

(51) Int. Cl.
| | |
|---|---|
| *H01M 4/134* | (2010.01) |
| *H01M 4/133* | (2010.01) |
| *H01M 4/36* | (2006.01) |
| *H01M 4/38* | (2006.01) |
| *H01M 4/583* | (2010.01) |
| *H01M 4/66* | (2006.01) |
| *H01M 10/0587* | (2010.01) |
| *H01M 4/02* | (2006.01) |

(52) U.S. Cl.
CPC ........... *H01M 4/134* (2013.01); *H01M 4/133* (2013.01); *H01M 4/364* (2013.01); *H01M 4/386* (2013.01); *H01M 4/583* (2013.01); *H01M 4/661* (2013.01); *H01M 10/0587* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 2005/0123829 A1 | 6/2005 | Fukui et al. | |
| 2005/0244711 A1 | 11/2005 | Fukui et al. | |
| 2010/0075217 A1 | 3/2010 | Yamamoto et al. | |
| 2010/0104951 A1 | 4/2010 | Iwama et al. | |
| 2011/0159370 A1 | 6/2011 | Inaba et al. | |
| 2016/0280981 A1 | 9/2016 | Lee et al. | |
| 2016/0304996 A1 | 10/2016 | Bronfin et al. | |
| 2017/0141404 A1 | 5/2017 | Song | |
| 2018/0151884 A1* | 5/2018 | Yushin | H01M 4/134 |
| 2019/0334177 A1 | 10/2019 | Lee et al. | |
| 2020/0014019 A1* | 1/2020 | Kim | H01M 4/66 |
| 2020/0014020 A1 | 1/2020 | Lee et al. | |
| 2021/0313617 A1* | 10/2021 | Yushin | H01M 4/366 |

FOREIGN PATENT DOCUMENTS

| | | | |
|---|---|---|---|
| CN | 104073685 B | 8/2016 | |
| CN | 110235286 A | 9/2019 | |
| JP | 2003-86186 A | 3/2003 | |
| JP | 2005-166530 A | 6/2005 | |
| JP | 2010-73571 A | 4/2010 | |
| JP | 2010-103006 A | 5/2010 | |
| JP | 2014-111827 A | 6/2014 | |
| JP | 2015-59266 A | 3/2015 | |
| JP | 2015059266 * | 4/2015 | C22C 9/00 |
| JP | 2017-507245 A | 3/2017 | |
| JP | 6355814 B2 | 7/2018 | |
| JP | 6379207 B2 | 8/2018 | |
| JP | 2019-26878 A | 2/2019 | |
| JP | 2019026878 * | 2/2019 | C25D 1/00 |
| JP | 6790153 B2 | 11/2020 | |
| KR | 10-2005-0027224 A | 3/2005 | |
| KR | 10-2013-0031301 A | 3/2013 | |
| KR | 10-2016-0034028 A | 3/2016 | |
| KR | 10-1733408 B1 | 5/2017 | |

(Continued)

OTHER PUBLICATIONS

English translation of JP 2019026878 (Year: 2019).*
English translation of JP 2015059266 (Year: 2015).*
International Search Report (PCT/ISA/210) issued in PCT/KR2022/015248 mailed on Jan. 27, 2023.
Japanese Office Action for Japanese Application No. 2023-526647, dated Jul. 1, 2024, with an English translation.
Chinese Office Action and Search Report for Chinese Application No. 202280007311.3, dated Jun. 6, 2025, with English translation of the Office Action.

*Primary Examiner* — Yoshitoshi Takeuchi

(74) *Attorney, Agent, or Firm* — Birch, Stewart, Kolasch & Birch, LLP

(57) ABSTRACT

An anode for a secondary battery and a jelly-roll type electrode assembly including the anode. The anode includes an anode current collector that satisfies a creep rate condition represented by Formula 1 within a certain range. When the anode is applied to the jelly-roll type electrode assembly, deformation and/or expansion of electrode assembly can be controlled, even if it contains a silicon-containing anode active material because the stress generated from the exterior is significantly low. It is possible to ensure excellent safety because the stress accumulated in the anode current collector is greatly reduced, which lowers the risk of an internal disconnection of the electrode assembly.

6 Claims, 1 Drawing Sheet

(56) References Cited

FOREIGN PATENT DOCUMENTS

| | | | |
|----|----------------|----|---------|
| KR | 10-1780908 | B1 | 9/2017 |
| KR | 10-2018-0114276 | A | 10/2018 |
| WO | WO 2010/050507 | A1 | 5/2010 |
| WO | WO 2013/080988 | A1 | 6/2013 |

* cited by examiner

PRIOR ART
100
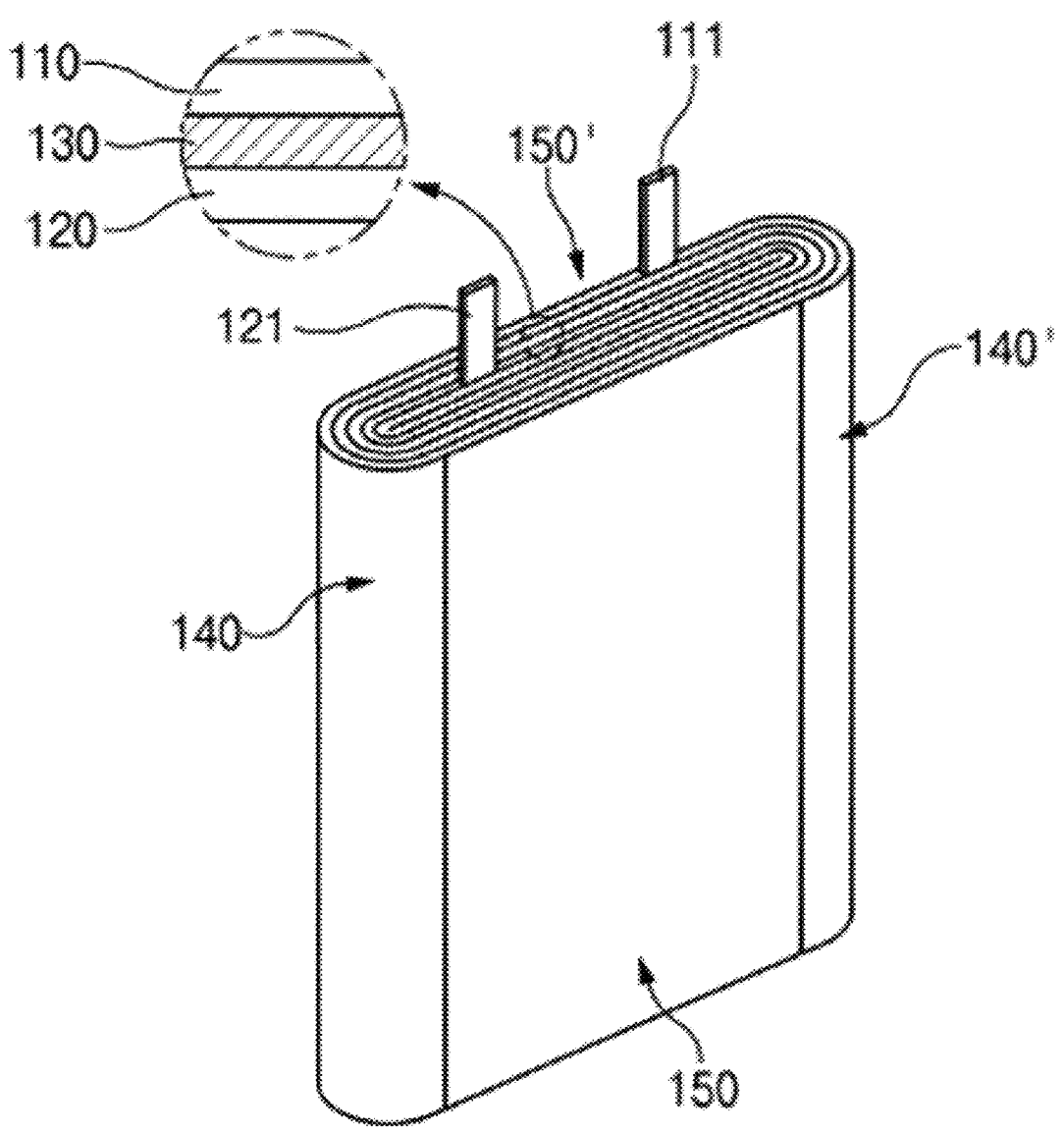

ANODE FOR SECONDARY BATTERY AND JELLY-ROLL TYPE ELECTRODE ASSEMBLY INCLUDING ANODE

TECHNICAL FIELD

The present invention relates to an anode for a secondary battery used in a jelly-roll type electrode assembly and the jelly-roll type electrode assembly that includes the anode.

This application claims the benefit of a priority based on Korean Patent Application No. 10-2021-0135030, filed on Oct. 12, 2021, and the entire contents of the Korean patent application are incorporated herein by reference.

BACKGROUND TECHNOLOGY OF THE INVENTION

Recently, a secondary battery is being widely applied not only to small devices such as hand-held electronic devices, but also to medium and large devices such as hybrid automobiles, battery packs of electric automobiles, or electric power storage devices.

Such secondary battery, depending on the shape of a battery case, is classified into a cylindrical battery or a prismatic battery that is embedded with a jelly-roll inside a cylindrical or a square shaped metal can, and a pouch-type battery that is embedded with a jelly-roll inside a pouch-type case made of an aluminum laminated sheet.

In addition, the electrode assembly embedded in the battery case is a power generation element that is capable of charging and discharging with a stacked structure of cathode/separation membrane/anode, and it is classified into a folding-type electrode assembly (jelly-roll) that interposes and winds up a long sheet-type separation membrane between the cathode and the anode, and a stack-type electrode assembly that consecutively stacks a predetermined size of multiple cathodes and anodes with the separation membrane interposed in between. Between the two, the jelly-roll type has an advantage of being easy to be manufactured and having a high energy density per weight.

The Figure is a perspective view that schematically shows a regular jelly-roll type electrode assembly. With reference to the Figure, the jelly-roll type electrode assembly 100 includes a cathode plate 110, an anode plate 120, and a separation membrane 130 interposed between the cathode plate 110 and the anode plate 120, and the cathode plate 110, the separation membrane 130, and the anode plate 120 are stacked up in order to have a winding structure.

Here, the cathode plate 110 includes a cathode current collector, a cathode active material layer and a cathode tap 111 that is joined to the non-coated space where cathode active material of the cathode current collector is not formed, and the anode plate 120 includes an anode current collector, an anode active material layer and an anode tap 121 that is joined to the non-coated space where anode active material of the anode current collector is not formed.

In addition, the electrode assembly 100 includes multiple round parts 140, 140' located on both sides of the electrode assembly 100 formed by winding and multiple flat parts 150, 150' that are partitioned by the round parts 140, 140'.

Because the jelly-roll type electrode assembly 100 is formed by winding the cathode plate 110 and the anode plate 120 that use metal-based positive electrode current collector and negative electrode current collector, unwinding can occur due to the restoring force of the metal, and the lithium secondary battery that includes this may cause deformation or expansion in the electrode assembly when it is being charged due to the stress difference between the round parts 140, 140' and the flat parts 150, 150', especially due to the stress concentrated in part where the round parts 140, 140' and the flat parts 150, 150' meet.

Especially, when silicon based active material is used to increase the charge-discharge capacity of the secondary battery, the stress accumulated in the anode plate 120 due to the big change in volume of the silicon based active material depending on charge-discharge significantly increases, causing the risk of the internal disconnection to be high.

Accordingly, while a method of introducing a winding fixing tape that wraps around the outer circumference of the electrode assembly in the same direction as the winding direction of the electrode assembly or fixing the outermost end with a tape after winding has been proposed, the method of introducing a winding fixing tape or fixing the end with a tape not only cannot sufficiently suppress swelling of the electrode assembly that can occur during charge-discharge of a lithium secondary battery or twisting during charging and discharging that can occur due to the stress difference between the interior and the exterior, but also cannot prevent the internal disconnection of the anode plate because the stress accumulated in the anode plate is very high.

Therefore, there is a need to develop an electrode and/or an electrode assembly which can suppress deformation and expansion due to a difference in stress on the outside of the electrode assembly that may occur during charging and discharging of a lithium secondary battery, particularly a secondary battery containing a silicon-based material as an anode active material, and can prevent internal disconnection from occurring.

PATENT DOCUMENT

Korean Patent Publication No. 10-2016-0034028

DESCRIPTION OF THE INVENTION

Technical Problem

Accordingly, the present invention is directed to provide a jelly-roll type electrode assembly where it has a large charge-discharge capacity by including a silicon-based anode active material, can control the deformation and/or expansion of the electrode assembly by reducing the stress produced by the exterior during the charge-discharge of the secondary battery, and improve the risk of the internal disconnection in the electrode assembly by having stress being accumulated in the anode plate to be significantly decreased.

Technical Solution

In order to solve the above-mentioned problem, one embodiment of the present invention provides an anode for a secondary battery that includes: an anode current collector; and an anode mixture layer present on at least one surface of the anode current collector; the anode mixture layer comprises an anode active material, which includes a silicon material, and when the creep rate of the anode current collector is measured under tensile force condition of 22±2° C. and 300 MPa, the anode current collector satisfies Formula 1 below by falling in between 20 μm/sec to 50 μm/sec:

$$C60-C2/58 \qquad \text{[Formula 1]}$$

wherein in Formula 1,

C60 represents the change in length of the anode current collector 60 seconds after a tensile force has been applied, and C2 represents the change in length of the anode current collector 2 seconds after a tensile force has been applied.

Here, the anode current collector can have a tensile strength of 20 kg/mm² to 45 kg/mm² and a percent elongation greater than or equal to 5%.

In addition, the silicon material of the anode active material may include one or more silicon-containing materials selected from the group consisting of Si, SiC, and $SiO_z$ (where $0.5 \leq z \leq 2.5$).

Here, the silicon material may be present from 1 to 40 parts by weight with respect to 100 parts by weight of the anode mixture layer.

Moreover, the anode active material may further include one or more carbon materials selected from the group consisting of natural graphite, artificial graphite, carbon black, acetylene black, Ketjen black, and carbon fiber.

In addition, the anode current collector may include one or more metal sheets selected from the group consisting of copper, aluminum, stainless steel, nickel, titanium, and baked carbon, and an average thickness of the anode current collector may be 1 μm to 500 μm.

In addition, one embodiment of the present invention provides a jelly-roll type electrode assembly that includes a cathode; an anode mentioned in the present invention; a separation membrane interposed between the cathode and the anode;

and has a winding structure with the cathode, the separation membrane, and the anode that are stacked up in order.

Furthermore, one embodiment of the present invention provides a cylindrical secondary battery that includes the above-mentioned jelly-roll type electrode assembly.

Advantageous Effects

The anode for the secondary battery according to the present invention, by having an anode current collector that satisfies the creep rate condition represented by Formula 1 within a certain range, can not only control deformation and/or expansion of an electrode assembly even if it contains a silicon-based anode active material because the stress generated from the exterior is significantly low, but also it has excellent safety because the stress accumulated in the anode current collector is greatly reduced, which lowers the risk of the internal disconnection of the electrode assembly.

BRIEF DESCRIPTION OF THE DRAWINGS

The FIGURE is a perspective view schematically showing a conventional electrode assembly.

BEST MODE FOR CARRYING OUT THE INVENTION

The present invention may have various modifications and various examples, and thus specific examples are illustrated in the drawings and described in detail in the detailed description.

However, it should be understood that the present invention is not limited to specific embodiments, and includes all modifications, equivalents or alternatives within the spirit and technical scope of the present invention.

The terms "comprise," "include" and "have" used herein designate the presence of characteristics, numbers, steps, actions, components or members described in the specification or a combination thereof, and it should be understood that the possibility of the presence or addition of one or more other characteristics, numbers, steps, actions, components, members or a combination thereof is not excluded in advance.

In addition, when a part of a layer, a film, a region or a plate is disposed "on" another part, this includes not only a case in which one part is disposed "directly on" another part, but a case in which a third part is interposed therebetween. In contrast, when a part of a layer, a film, a region or a plate is disposed "under" another part, this includes not only a case in which one part is disposed "directly under" another part, but a case in which a third part is interposed therebetween. In addition, in this application, "on" may include not only a case of disposed on an upper part but also a case of disposed on a lower part.

In the present invention, "embrittlement" means a phenomenon where a material does not show plastic deformation and gets destroyed when it is subjected to an external force.

Furthermore, in the present invention, "main component" means a component that is greater than or equal to 80 wt %, 90 wt %, 95 wt %, or 97.5 wt % with respect to the total weight of the subject material, and in some cases, it may mean a material of 100 wt %. For example, "having silicon as a main component" means that a particle may include Si, SiO, and/or $SiO_2$ greater than or equal to 80 wt %, 90 wt %, or 98 wt % of its total weight, and in some cases, it may include 100 wt % of the component.

Hereinafter, the present invention will be described in further detail.

Anode for Secondary Battery

One embodiment of the present invention provides an anode for a secondary battery that includes: an anode current collector; an anode mixture layer present on at least one surface of the anode current collector; the anode mixture layer comprises an anode active material, which includes a silicon material, and when the creep rate of the anode current collector is measured under tensile force condition of 22±2° C. and 300 MPa, it satisfies Formula 1 below by falling in between 20 μm/sec~50 μm/sec:

$$C60-C2/58 \qquad \text{[Formula 1]}$$

wherein in Formula 1,

C60 represents the change in length of the anode current collector 60 seconds after a tensile force has been applied, and C2 represents the change in length of the anode current collector 2 seconds after a tensile force has been applied.

The anode for the secondary battery according to the present invention is used in a jelly-roll type electrode assembly, and includes an anode mixture layer that is manufactured by coating, drying, and pressing an anode slurry comprising an anode active material on an anode current collector.

Here, the anode current collector may include a metal sheet that satisfies the creep rate condition represented by Formula 1 within a certain range.

Formula 1 above represents a proportion between the change in length of the anode current collector 2 seconds after a tensile force has been applied (C2) and the change in length of the anode current collector 60 seconds after a tensile force has been applied (C60) when the creep rate of the anode current collector is measured by applying a tensile force of 300 MPa in room temperature. To be more specific, "creep rate" is the degree of deformation of the anode current collector over time, and it represents the rate of change in the length of the anode current collector over time when constant force is applied to the metal sheet at a certain temperature. The anode current collector according to the present invention has a configuration of including an anode current collector that has a creep rate at certain time interval (60 sec−2 sec=58 sec) represented by Formula 1, that is, the anode current collector that satisfies a certain range of deformation rate at a certain time interval (58 seconds).

In one example, the anode current collector according to the present invention may satisfy the creep rate condition represented by Formula 1 within 20 μm/sec~50 μm/sec, specifically within 20 μm/sec~45 μm/sec; 20 μm/sec~40 μm/sec; 20 μm/sec~30 μm/sec; 25 μm/sec~40 μm/sec; 35 μm/sec~45 μm/sec; or 25 μm/sec~30 μm/sec.

The present invention, by controlling the creep rate condition of the anode current collector into the above range, can prevent the volume of the electrode assembly from excessively increasing due to a remarkably low creep rate when using the anode current collector of the jelly-roll type electrode assembly, and can prevent the risk of rupture in the anode current collector from increasing due to the excessive creep rate. Meanwhile, because the creep rate may be influenced by the measurement temperature, a tensile force being applied, components of the anode current collector, and size of the grain, so the Formula 1 may yield different values due to the elements stated above even if it is the same anode current collector.

In addition, besides the creep rate condition represented by Formula 1, the anode current collector may also satisfy tensile strength and/or elongation rate in a certain range. Generally, fragments of metal sheets generated in the cutting process of manufacturing an electrode may partially exist on the anode current collector, and this may cause OCV (open circuit voltage) defect in the battery process. In order to prevent decrease in embrittlement in the anode current collector, the anode current collector in the present invention may control tensile strength and/or elongation rate to a certain range.

In one example, the anode current collector can have tensile strength between specifically between 20~40 kg/mm²; 25~45 kg/mm²; 25~40 kg/mm²; 30~40 kg/mm²; or 32~38 kg/mm².

In another example, the anode current collector can have elongation rate greater than or equal to 5%, specifically between 5%~18%; 5%~15%; 8%~13%; 9%~12%; 10%~15%; 11%~15%; or 11%~12%.

Furthermore, if the anode current collector is used as an electrode current collector of the secondary battery in the industry, it can be applied without any particular limitations. For example, the anode current collector may use copper, aluminum, stainless steel, nickel, titanium, and baked carbon, which have high conductivity and do not trigger chemical change in the battery, and in the case of aluminum or stainless steel, it can include a metal sheet with its surface treated with carbon, nickel, titanium, silver, etc.

In addition, the anode current collector may have a thickness of 1 μm~500 μm, specifically between 1 μm~300 μm; 1 μm~200 μm; 1 μm~100 μm; 1 μm~90 μm; 1 μm~50 μm; 10 μm~200 μm; 50 μm~300 μm; 80 μm~200 μm; or 100 μm~180 μm.

Additionally, the anode mixture layer, as an anode active material, includes a silicon material. The silicon material, as a metal element, may include one or more silicon materials selected from the group consisting of Si, SiC, and $SiO_z$ (where $0.5 \leq z \leq 2.5$). Specifically, the silicon material may include pure silicon particles and/or silicon oxide particles.

In addition, the silicon material may be included as 1~40 parts by weight with respect to anode mixture layer of 100 parts by weight, specifically be included as 1~30 parts by weight; 1~20 parts by weight; 1~10 parts by weight; 4~22 parts by weight; 15~30 parts by weight; 20~40 parts by weight; 25~35 parts by weight; 3~8 parts by weight; or 11~19 parts by weight with respect to the 100 parts by weight of anode mixture layer.

Pure silicon (Si) exhibits a high theoretical capacity of 4020 mAh/g, and because silicon atom can react with maximum of 4.4 lithium atoms, manufacturing a secondary battery with a silicon material that has silicon as the main component can implement a high charge-discharge capacity. However, since silicon material have a big change in volume during charging-discharging process and appl significant amount of stress to the exterior of the jelly-roll type electrode assembly, this causes deformation and/or expansion of an electrode assembly, and in the case where it has a high silicon content, the internal disconnection due to damage in an anode current collector may occur. However, the anode for the secondary battery of the present invention has an anode current collector that satisfies the creep rate condition represented by Formula 1 at a certain range, and in the case where it is applied to the anode of a jelly-roll type electrode assembly, as an anode active material of a secondary battery, it can prevent the electrode assembly from deforming and/or expanding and prevent the internal disconnection due to the stress generated from the exterior of the electrode assembly even if it contains significant amount of silicon material.

Furthermore, besides silicon material, the anode mixture layer, as an anode active material, can further include a carbon material. Specifically, the anode active material can further contain a carbon material which has carbon atom as its main component, and such carbon materials may be selected from the group consisting of natural graphite, artificial graphite, carbon black, acetylene black, Ketjen black, and carbon fiber.

In this case, carbon material may be included as 60~99 parts by weight with respect to anode mixture layer of 100 parts by weight, specifically be included as 70~99 parts by weight; 80~99 parts by weight; 90~99 parts by weight; 78~96 parts by weigh; 70~85 parts by weight; 60~80 parts by weight; 65~75 parts by weight; 91~97 parts by weight; or 81~89 parts by weight with respect to the 100 parts by weight of anode mixture layer.

The anode according to the present invention, by having the above-mentioned composition, can not only implement a high charge-discharge capacity, but it can also lower the stress generated from the exterior of the electrode assembly if used on the jelly-roll type electrode assembly, which can reduce the stress accumulated on the exterior, effectively improving the safety of a secondary battery.

Jelly-roll Type Electrode Assembly

In addition, one embodiment of the present invention provides a jelly-roll type electrode assembly that includes a cathode; an anode according to the present invention; a separation membrane interposed between the cathode and the anode;

and has a winding structure with the cathode, the separation membrane, and the anode stacked up in order.

The jelly-roll type electrode assembly according to the present invention includes the cathode, the anode, and the separation membrane, and it is manufactured by winding the cathode and the anode stacked up on both sides of the separation membrane in a round shape.

Here, as the anode of the electrode assembly, including the anode of the present invention, can greatly reduce the stress accumulated in the exterior of the electrode assembly, especially in the round division of the exterior formed by winding.

Here, because the anode includes components that have same function and role as in the anode for a secondary battery described previously, detailed explanation related to this will be omitted.

Meanwhile, the cathode provided in the jelly-roll type electrode assembly according to the present invention is used in the jelly-roll type electrode assembly, and includes a cathode mixture layer that is manufactured by coating, drying, and pressing a cathode active material on a cathode current collector, and may selectively include a conductive material, a binder, and other additives as needed.

While the cathode active material may include materials that are normally applied to a lithium secondary battery, it may also preferably include complex lithium metal oxide that contains three or more elements selected from the group consisting of nickel, cobalt, manganese, and aluminum; and the complex lithium metal oxide in some cases may take a form of being doped with other transition metals($M^1$). For example, the cathode active material may be a complex lithium metal oxide represented by Chemical Formula 1 below that is capable of reversible intercalation and deintercalation:

$$Li_x[Ni_yCo_zMn_wM^1_v]O_u \qquad \text{[Chemical Formula 1]}$$

In the Chemical Formula 1, $M^1$ is one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, and x, y, z, w, v, and u are respectively $1.0 \leq x \leq 1.30$, $0.1 \leq y \leq 0.95$, $0.01 \leq z \leq 0.5$, $0 \leq w \leq 0.5$, $0 \leq v \leq 0.2$, and $1.5 \leq u \leq 4.5$.

In one example, the cathode active material may include one or more compounds selected from the group consisting of $LiNi_{1/3}Co_{1/3}Mn_{1/3}O2$, $LiNi_{0.8}Co_{0.1}Mn_{0.1}O_2$, $LiNi_{0.6}Co_{0.2}Mn_{0.2}O_2$, $LiNi_{0.9}Co_{0.05}Mn_{0.05}O_2$, $LiNi_{0.6}Co_{0.2}Mn_{0.1}Al_{0.1}O_2$, $LiNi_{0.6}Co_{0.2}Mn_{0.15}Al_{0.05}O_2$, and $LiNi_{0.7}Co_{0.1}Mn_{0.1}Al_{0.1}O_2$.

In addition, the cathode, as a cathode current collector, may use materials that have high conductivity and do not trigger chemical change in the battery concerned. For example, it may use copper, aluminum, stainless steel, nickel, titanium, and baked carbon, and in the case of aluminum or stainless steel, it can include a metal sheet with its surface treated with carbon, nickel, titanium, silver, etc.

In addition, the cathode current collector forms a tiny rib on its surface and increases the adhesive strength of cathode active material, and it can have various forms that include a film, a sheet, a foil, a net, a porous material, a foam, a nonwoven fabric, etc. Moreover, the average thickness of the current collector can be properly applied within 3~500 μm, considering the conductivity and the total thickness of the cathode being manufactured.

In addition, the separation membrane provided in the jelly-roll type electrode assembly according to the present invention is an insulating film with high ion permeability and mechanical strength, and while it is not particularly limited if it is generally being used in the industry, it can specifically include one or more polymers selected from the group consisting of chemically resistant/hydrophobic polypropylene; polyethylene; and polyethylene-propylene copolymer. The membrane can take a form of porous polymer substrate such as a sheet or a nonwoven fabric that contains above-mentioned polymer, and in some cases can take a form of composite membrane where a porous polymer substrate is coated with an organic matter or an inorganic matter by an organic binder. Moreover, the membrane can have an average pore diameter of 0.01~10 μm, and its average thickness of 5~300 μm.

Cylindrical Secondary Battery

Furthermore, one embodiment of the present invention provides a cylindrical secondary battery that includes a jelly-roll type electrode assembly of the present invention.

The cylindrical secondary battery according to the present invention has the above-mentioned jelly-roll type electrode assembly according to the present invention inserted into a cylindrical metal can which is the battery case, and has a structure of electrolyte being injected. The cylindrical secondary battery according to the present invention is equipped with the jelly-roll type electrode assembly of the present invention has a significantly low stress of the electrode assembly exterior and a significantly low stress accumulated inside the electrode assembly, allowing high capacity of the battery. And even if it contains a silicon-based anode active material that has a big change rate in volume during charge-discharge, the internal disconnection does not occur, which provides an advantage of excellence in safety.

Here, because the jelly-roll type electrode assembly has the same function and role as in the jelly-roll type electrode assembly described previously, detailed explanation related to this will be omitted.

In addition, the electrolyte is generally being applied in the industry, it can be applied without any particular limitations. Specifically, the electrolyte, as lithium salt containing electrolyte, and can be composed of electrolyte and lithium salt, and nonaqueous organic solvent, organic solid electrolyte, and inorganic solid electrolyte can be used as an electrolyte.

The nonaqueous organic solvent, for example, may use aprotic organic solvents such as N-methyl-2-pyrolidinone, ethylene carbonate, propylene carbonate, butylene carbonate, dimethyl carbonate, diethyl carbonate, gamma-butyrolactone, 1,2-dimethoxyethane, tetrahydrofuran, 2-Methyltetrahydrofuran, dimethyl sulfoxide, 1,3-dioxolane, formamide, dimethylformamide, dioxolane, acetonitrile, nitromethane, methyl formate, methyl acetate, triethyl phosphate, trimethoxy methane, dioxolane derivative, sulfolane, methyl sulfolane, 1,3-dimethyl-2-imidazolidinone, propylene carbonate derivative, tetrahydrofuran derivative, ether, methyl propionate, ethyl propionate, etc.

The organic solid electrolyte, for example, may use polyethylene derivative, polyethylene oxide derivative, polypropylene oxide derivative, phosphate ester polymer, poly alginate lysine, polyester sulfide, polyvinyl alcohol, polyvinylidene fluoride, polymerizing materials containing ionic dissociable group, etc.

The inorganic solid electrolyte, for example, may use nitride, halide, and sulfate of lithium such as $Li_3N$, LiI, LiSiO$_5$Ni$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, Li$_3$PO$_4$—Li$_2$S—SiS$_2$, etc.

The lithium salt, as a substance highly soluble in non-aqueous electrolyte, for example., may use LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$NLi, chloro borane lithium, low-grade aliphatic carboxylate lithium, 4-phenyl boronic acid lithium, imide, etc.

In addition, in order to improve charge-discharge property, incombustibility, etc., electrolyte may be added with, for example, pyridine, triethylphosphite, triethanolamine, cyclic ether, ethylenediamine, n-glyme, hexaphosphoric triamide, nitrobenzene derivative, sulfur, quinonimine dye, N-substituted oxazolidinone, N-N-substituted imidazolidine, ethylene glycol dialkyl ether, ammonium salt, pyrrole, 2-methoxyethanol, and aluminum trichloride. In some cases, in order to grant incombustibility, halogen containing solvent such as carbon tetrachloride and ethylene trifluoride can be added. And in order to improve high-temperature conservation property, carbon dioxide gas, FEC (Fluoro-Ethylene Carbonate), PRS (Propene sultone), etc. can be added.

Mode for Carrying Out the Invention

Examples 1 to 2 and Comparative Examples 1 to 2. Manufacture of Anode for Jelly-Roll Type Electrode Assembly An anode slurry for a lithium secondary battery was manufactured by weighing and putting in the following materials and mixing them for 60 minutes in 2,000 rpm: 86 parts by weight of artificial graphite and 10 parts by weight of silicon particles which are anode active material; 2 parts by weight of carbon black which is a conductive material; 2 parts by weight of styrene-butadiene rubber (SBR) and carboxymethyl cellulose (CMC) which are binders. Apart from this, the anode used in a jelly-roll type electrode assembly was made by preparing a copper sheet with property as illustrated in Table 1, applying an anode slurry to both sides of the prepared copper sheet (average thickness: 10 μm), and drying and rolling the sheet.

Here, the creep rate of the copper sheet was measured by cutting out the copper sheet to a piece of length 150 mm and width 12.7 mm, fixing it to a UTM measurement instrument, and applying a consistent tensile force of 300 MPa in 22° C. to measure change in the copper sheet length over time. Then, from the measurement result, the creep rate(μm/sec) was calculated by using Formula 1 below.

$$C60{-}C2/58 \qquad \text{[Formula 1]}$$

In Formula 1,

C60 represents the change in length of the anode current collector 60 seconds after a tensile force has been applied, C2 represents the change in length of the anode current collector 2 seconds after a tensile force has been applied,

TABLE 1

| | Tensile Strength [kg/mm$^2$] | Elongation Percentage [%] | Creep Rate [μm/sec] |
|---|---|---|---|
| Example 1 | 34.2 | 11.8 | 27.1 |
| Example 2 | 33.6 | 12.1 | 40.1 |
| Comparative Example 1 | 36.3 | 11.3 | 6.53 |

TABLE 1-continued

| | Tensile Strength [kg/mm$^2$] | Elongation Percentage [%] | Creep Rate [μm/sec] |
|---|---|---|---|
| Comparative Example 2 | 32.8 | 12.6 | 65.1 |

Examples 3 to 4 and Comparative Examples 3 to 4. Manufacture of Jelly-Roll Type Electrode Assembly A cathode slurry for a lithium secondary battery was manufactured by first injecting N-Methylpyrrolidone, weighing and putting in the following materials and mixing them for 60 minutes in 2,000 rpm: 97.8 parts by weight of LiNi$_{0.6}$Co$_{0.2}$Mn$_{0.2}$O$_2$, which is a cathode active material, with respect to 100 parts by weight of solid cathode slurry; 0.7 part by weight of carbon black which is a conductive material; and 1.5 parts by weight of PVdF which is a binder. The cathode was manufactured by applying the manufactured cathode slurry onto both sides of an aluminum sheet, then drying and rolling the sheet.

The jelly-roll type electrode assembly was manufactured by interposing a porous polyethylene (PE) film (average thickness: 20 μm) between the manufactured cathode and the anode manufactured in Examples 1 to 2 and Comparative Examples 1 to 2 and winding it. Here, the anode used in the manufactured electrode assembly of each example and comparative example is shown in Table 2 below.

TABLE 2

| | Type of Anode Used |
|---|---|
| Example 3 | Anode in Example 1 |
| Example 4 | Anode in Example 2 |
| Comparative Example 3 | Anode in Comparative Example 1 |
| Comparative Example 4 | Anode in Comparative Example 2 |

Experimental Example

The following experiment was performed to evaluate the performance of the anode for a secondary battery according to the present invention, as well as the performance of the jelly-roll type electrode assembly including it.

a) Evaluation of Internal Disconnection

Whether an internal disconnection occurs in a cylindrical secondary battery was evaluated in terms of each manufactured cylindrical secondary battery after inserting the electrode assembly manufactured in examples 3 to 4 and comparative examples 3 to 4 into a cylindrical can and injecting electrolyte.

Specifically, after carrying out charge-discharge of each manufactured cylindrical secondary battery 10 times in CC/CV mode, each secondary battery was disassembled to check whether there is an internal disconnection in the anode of the secondary battery. Here, the charging was done until it reaches 4.25 V in 1 C, and the discharging was done until it reaches 2.5 V in constant current of 1 C. The result is shown in the following Table 3.

b) Evaluation of Charge-Discharge Battery Life

The charge-discharge battery life was evaluated in terms of each manufactured cylindrical secondary battery after inserting the electrode assembly manufactured in examples 3 to 4 and comparative examples 3 to 4 into a cylindrical can and injecting electrolyte.

The battery was charged until the voltage reached 4.2 V in a CC (Constant Current) mode of 0.33 C in a constant temperature of 45° C. Then, after the battery was discharged until the voltage reached 2.5 V in a CC (Constant Current) mode of 0.33 C, it was additionally discharged until the voltage value reached 0.05% of the initial voltage value in a CV (Constant Voltage) mode to check the discharge capacity of the first round.

Then, the same charge-discharge procedure was done 200 times, and the charge-discharge capacity retention rate in 0.33 C was calculated by dividing the discharge capacity measured in the final round by the discharge capacity measured in the first round. The calculation result is shown in Table 3.

TABLE 3

| | Whether Disconnection Occurred | Capacity Retention Rate (in percentage) |
|---|---|---|
| Example 3 | not occurred | 99.3% |
| Example 4 | not occurred | 99.1% |
| Comparative Example 3 | Occurred | 96.2% |
| Comparative Example 4 | not occurred | 88.7% |

As shown in the Table 3, a cylindrical secondary battery that has the anode of the example satisfies the creep rate condition of Formula 1 within 20~50 μm/sec, has a superior charge-discharge capacity retention rate of greater than or equal to 97%, prevents deformation and/or expansion of the electrode assembly, and inhibits the occurrence of internal disconnection.

On the other hand, the secondary battery of Comparative Example 3 that has an anode with the creep rate condition of Formula 1 less than 20 μm/sec has a high capacity retention rate, but it seems to have deformation and/or expansion of the electrode assembly induced and have internal disconnection to occur.

In addition, while there is no internal disconnection in the secondary battery of Comparative Example 4 that has an anode with the creep rate condition of Formula 1 greater than 50 μm/sec, wrinkles occur between the rolled anode mixture layer and the non-coated space, damaging the anode in charging-discharging progresses, which causes the capacity retention rate of the battery to be significantly reduced.

From these results, it can be known that the anode for the secondary battery according to the present invention, by satisfying the creep rate condition represented by Formula 1 within a certain range, when it is applied to the jelly-roll type electrode assembly, can significantly reduce the stress generated by the exterior even if it contains a silicon-based anode active material, and can also significantly reduce the stress accumulated in the anode current collector.

As described above, the present invention has been described with reference to exemplary embodiments, but it should be understood by those killed in the art or those of ordinary skill in the art that the present invention can be variously modified and changed without departing from the spirit and technical scope of the present invention described in the accompanying claims.

Accordingly, the technical scope of the present invention is not limited to the content described in the detailed description of the specification, but should be defined by the claims.

REFERENCE NUMERALS

100: ELECTRODE ASSEMBLY
110: CATHODE PLATE
111: CATHODE TAP
120: ANODE PLATE
121: ANODE TAP
130: SEPARATION MEMBRANE
140 and 140': ROUND PART
150 and 150': FLAT PART

The invention claimed is:

1. An anode for a secondary battery comprising:

an anode current collector; and an anode layer mixture present on at least one surface of the anode current collector;

wherein the anode mixture layer comprises an anode active material comprises a silicon material, artificial graphite, and carbon black, wherein the anode current collector satisfies a creep rate of Formula 1 below by falling in between 27 μm/sec to 40.1 μm/sec, wherein the creep rate is measured under a tensile force condition of 22±2° C. and 300 MPa:

$$C60{-}C2/58 \qquad \text{[Formula 1]}$$

wherein in Formula 1,

C60 represents a change in length of the anode current collector 60 seconds after the tensile force has been applied, and C2 represents a change in length of the anode current collector 2 seconds after the tensile force has been applied, wherein the anode current collector has a tensile strength of 33.6 kg/mm² to 34.2 kg/mm², wherein the anode current collector comprises copper, wherein the anode current collector has an elongation rate of 11 to 15%, and wherein the silicon material is present from 1 to 40 parts by weight with respect to 100 parts by weight of the anode mixture layer.

2. The anode for the secondary battery of claim 1, wherein the silicon material of the anode active material comprises one or more silicon-containing materials selected from the group consisting of Si, SiC, and SiOz, wherein $0.5{\le}z{\le}2.5$.

3. The anode for the secondary battery of claim 1, wherein the anode current collector has an average thickness of 1 μm to 500 μm.

4. The anode for the secondary battery of claim 1, wherein the elongation rate of the anode current collector is in a range of 11.8 to 12.1.

5. A jelly-roll type electrode assembly comprising:

a cathode;

the anode according to claim 1; and a separation membrane that is interposed between the cathode and anode, wherein the cathode, the separation membrane, and the anode are stacked in a winding structure.

6. A cylindrical secondary battery comprising the jelly-roll type electrode assembly according to claim 5.

* * * * *